United States Patent Office 3,577,263
Patented May 4, 1971

3,577,263
EPOXY RESIN-SILOXANE COATED ARTICLE
John D. Nordstrom, Detroit, Mich., assignor to Ford Motor Company, Dearborn, Mich.
No Drawing. Filed Nov. 18, 1968, Ser. No. 777,551
Int. Cl. B44d 1/50, 1/44
U.S. Cl. 117—93.31
8 Claims

ABSTRACT OF THE DISCLOSURE

A radiation-curable, film-forming paint binder is prepared from an alpha-beta olefinically unsaturated epoxy resin and an alpha-beta olefinically unsaturated siloxane having at least two functional groups selected from hydroxyl groups and hydrocarbonoxy groups with a hydroxyl bearing ester of an alpha-beta olefinically unsaturated carboxylic acid. In a preferred embodiment, the binder solution also contains vinyl monomers. The preferred hydroxyl bearing esters are acrylates and methacrylates. The paint binder is applied as a liquid film to a substrate and cured thereon by an electron beam.

This invention relates to the art of coating and is concerned with paint and painted articles of manufacture wherein the painted surface has high resistance to weathering. This invention is particularly concerned with articles of manufacture having external surfaces of wood, metal or synthetic polymeric solid coated with an in situ formed polymerization product of a radiation-curable paint binder crosslinked on said surface by ionizing radiation and comprising a film-forming solution of an alpha-beta olefinically unsaturated epoxy resin and an alpha-beta olefinically unsaturated polysiloxane, the reaction product of one molar part siloxane having at least two hydroxyl and/or hydrocarbonoxy groups and, preferably at least two molar parts of, a hydroxyl bearing ester of an alpha-beta unsaturated carboxylic acid. In a preferred embodiment, the film-forming solution also contains vinyl monomers.

In this application, the term "paint" is meant to include pigment and/or finely ground filler, the binder without pigment and/or filler or having very little of the same, which can be tinted if desired. Thus, the binder which is ultimately converted to a durable film resistant to weathering, can be all or virtually all that is used to form the film, or it can be a vehicle for pigment and/or particulate filler material.

The siloxanes employed in the preparation of the binder have a reactive hydroxyl or hydrocarbonoxy group bonded to at least two of its silicon atoms. The term "siloxane" as employed herein refers to a compound containing a

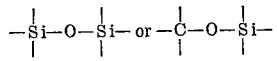

linkage, with the remaining valences being satisfied by a hydrocarbon radical, a hydrocarbonoxy group, hydrogen, a hydroxyl group, or an oxygen atom which interconnects the silicon atom providing such valence with another silicon atom.

The acyclic siloxane molecules which can be used in preparing the paint binder resins in this invention advantageously contain about 3 to about 18 silicon atoms per molecule with corresponding oxygen linkages. The preferred siloxanes are represented by the following general formula:

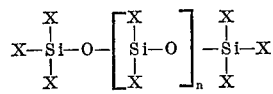

wherein $n$ is at least 1 and X is (a) a $C_1$ to $C_8$ monovalent hydrocarbon radical, preferably a $C_1$ to $C_4$ alkyl radical, or (b) $C_1$ to $C_8$ monovalent hydrocarbonoxy radical, preferably a $C_1$ to $C_4$ alkoxy radical, or (c) a hydroxyl radical, or (d) hydrogen, with at least two of the X groups separated by a

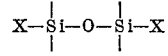

linkage being either (b) or (c).

The cyclic siloxanes which can be used in preparing the paint binder resins of this invention contain at least 3, preferably 6 to 12, and ordinarily not more than 18, silicon atoms per molecule with corresponding oxygen linkages. The cyclic polysiloxanes used may take the form of one of the following type formulas:

(I) $\qquad X_{n'}Si_nO_{n''}$ where $n$ = and odd numbered positive integer of at least 3,
$n' = 2n$, and
$n'' = n$
X = (a) a $C_1$ to $C_8$ monovalent hydrocarbon radical, preferably a $C_1$ to $C_4$ alkyl radical, or
(b) a $C$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

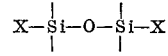

linkage being either (b) or (c)
Exemplified by the following formula:

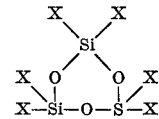

(II) $\qquad X_{n'}Si_nO_{n''}$ where $n$ = an odd numbered positive integer of at least 5,
$n' = n+3$, and
$n'' = 6$, $6+3$ or $6+$a multiple of 3
X = (a) a $C_1$ to $C_8$ monovalent hydrocarbon radical, preferably a $C_1$ to $C_4$ alkyl radical, or
(b) a $C_1$ to $C_8$ monovalent hydrocarbonoxy radical, preferably a $C_1$ to $C_4$ alkoxy radical, or
(c) a hydroxyl radical, or
(d) hydrogen—with at least two of the X groups separated by a

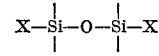

linkage being either (b) or (c)
Exemplified by the following structural formula:

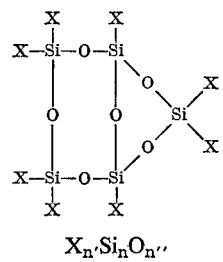

(III) $\qquad X_{n'}Si_nO_{n''}$ where
$n = 6$ or a multiple of 6,
$n' = 8$, $8+6$, or $8+$a multiple of 6
$n'' = 8$, $8+9$, or $8+$a multiple of 9
X = (a) a $C_1$ to $C_8$ monovalent hydrocarbon radical, preferably a $C_1$ to $C_4$ alkyl radical, or
 (b) a $C_1$ to $C_8$ monovalent hydrocarbonoxy radical, preferably a $C_1$ to $C_4$ alkoxy radical, or
 (c) a hydroxyl radical, or
 (d) hydrogen—with at least two of the X groups separated by a

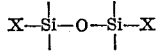

linkage being either (b) or (c)
Exemplified by the following structural formula:

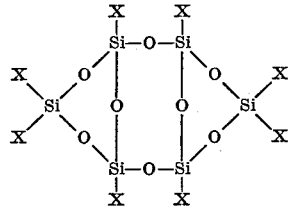

or a condensation dimer, trimer, etc., thereof formed with loss of water or alcohol.

(IV) $X_{n'}Si_nO_{n''}$ where
$n =$ an even numbered positive integer of at least 4,
$n' = n+4$, and
$n'' = 4$, $4+3$, or $4+$a multiple of 3
X = (a) a $C_1$ to $C_8$ monovalent hydrocarbon radical, preferably a $C_1$ to $C_4$ alkyl radical, or
 (b) a $C_1$ to $C_8$ monovalent hydrocarbonoxy radical, preferably a $C_1$ to $C_4$ alkoxy radical, or
 (c) a hydroxyl radical, or
 (d) hydrogen—with at least two of the X groups separated by a

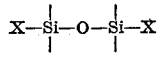

linkage being either (b) or (c)
Exemplified by the following structural formula:

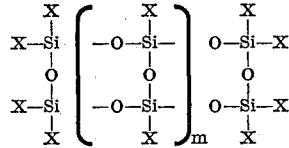

where $m$ is 0 or a positive integer.

(V) $X_{n'}Si_nO_{n''}$ where
$n =$ an even numbered positive integer of at least 8,
$n' = n+2$, and
$n'' = 11$, $11+3$, or $11+$a multiple of 3
X = (a) a $C_1$ to $C_8$ monovalent hydrocarbon radical, preferably a $C_1$ to $C_4$ alkyl radical, or
 (b) a $C_1$ to $C_8$ monovalent hydrocarbonoxy radical, preferably a $C_1$ to $C_4$ alkoxy radical, or
 (c) a hydroxyl radical, or
 (d) hydrogen—with at least two of the X groups separated by a

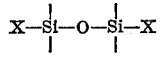

linkage being either (b) or (c)
Exemplified by the following structural formula:

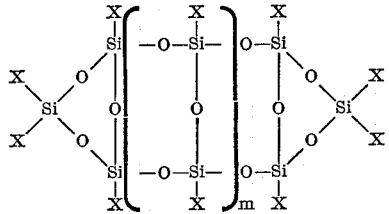

where $m$ is a positive integer.

A variety of methods are known to the art for preparing siloxanes. These include controlled hydrolysis of silanes, polymerization of a lower molecular weight siloxane, reacting silicon tetrachloride with an alcohol, etc. The preparation of siloxanes and their incorporation into organic resins is disclosed in U.S. Patents 3,154,597; 3,074,904; 3,044,980; 3,044,979; 3,015,637; 2,996,479, 2,973,287; 2,937,230; and 2,909,549.

The hydroxyl bearing ester is preferably a monohydroxy alkyl ester of an alpha-beta olefinically unsaturated monocarboxylic acid. The preferred hydroxy esters are acrylates and methacrylates in that they provide olefinic unsaturation between the terminal carbon atoms and are readily polymerizable at relatively low doses of ionizing radiation. A partial and exemplary list of such acrylates follows:

2-hydroxyethyl acrylate or methacrylate
2-hydroxypropyl acrylate or methacrylate
2-hydroxybutyl acrylate or methacrylate
2-hydroxyoctyl acrylate or methacrylate
2-hydroxydodecanyl acrylate or methacrylate
2-hydroxy-3-chloropropyl acrylate or methacrylate
2-hydroxy-3-acryloxypropyl acrylate or methacrylate
2-hydroxy-3-methacryloxypropyl acrylate or methacrylate
2-hydroxy-3-allyloxypropyl acrylate or methacrylate
2-hydroxy-3-cinnamylpropyl acrylate or methacrylate
2-hydroxy-3-phenoxypropyl acrylate or methacrylate
2-hydroxy-3-(o-chlorophenoxy)propyl acrylate or methacrylate
2-hydroxy-3-(p-chlorophenoxy)propyl acrylate or methacrylate
2-hydroxy-3-(2,4-dichlorophenoxy)propyl acrylate or methacrylate
2-hydroxy-3-acetoxypropyl acrylate or methacrylate
2-hydroxy-3-propionoxypropyl acrylate or methacrylate
2-hydroxy-3-chloroacetoxypropyl acrylate or methacrylate
2-hydroxy-3-dichloroacetoxypropyl acrylate or methacrylate
2-hydroxy-3-trichloroacetoxypropyl acrylate or methacrylate
2-hydroxy-3-benzoxypropyl acrylate or methacrylate
2-hydroxy-3-(o-chlorobenzoxy)propyl acrylate or methacrylate
2-hydroxy-3-(p-chlorobenzoxy)propyl acrylate or methacrylate
2-hydroxy-3-(2,4-dichlorobenzoxy)propyl acrylate or methacrylate
2-hydroxy-3-(3,4-dichlorobenzoxy)propyl acrylate or methacrylate
2-hydroxy-3-(2,4,6-trichlorophenoxy)propyl acrylate or methacrylate
2-hydroxy-3-(2,4,5-trichlorophenoxy)propyl acrylate or methacrylate
2-hydroxy-3-(o-chlorophenoxyacetoxy)propyl acrylate or methacrylate
2-hydroxy-3-phenoxyacetoxypropyl acrylate or methacrylate
2-hydroxy-3-(p-chlorophenoxyacetoxy)propyl acrylate or methacrylate
2-hydroxy-3-(2,4-dichlorophenoxyacetoxy)propyl acrylate or methacrylate
2-hydroxy-3-(2,4,5-trichlorophenoxyacetoxy)propyl acrylate or methacrylate 2-hydroxy-3-crotonoxypropyl acrylate or methacrylate
2-hydroxy-3-cinnamyloxypropyl acrylate or methacrylate
3-acryloxy-2-hydroxypropyl acrylate or methacrylate
3-allyloxy-2-hydroxypropyl acrylate or methacrylate
3-chloro-2-hydroxypropyl acrylate or methacrylate
3-crotonoxy-2-hydroxypropyl acrylate or methacrylate In addition to acrylates and methacrylates one may also use cinnamates, crotonates, etc.

The term "ionizing radiation" as employed herein means radiation having sufficient energy to effect polymerization of the paint films herein disclosed, i.e. energy equivalent to that of about 5,000 electron volts or greater. The preferred method of curing films of the instant paints upon substrates to which they have been applied is by subjecting such films to a beam of polymerization effecting electrons having an average energy in the range of about 100,000 to about 500,000 electron volts. When using such a beam, it is preferred to employ a minimum of 25,000 electron volts per inch of distance between the radiation emitter and the workpiece where the intervening space is occupied by air. Adjustment can be made for the relative resistance of the intervening gas which is preferably an oxygen-free inert gas such as nitrogen or helium. I prefer to employ an electron beam which at its source of emission has average energy in the range of about 150,000 to about 500,000 electron volts.

The films formed from the paints of this invention are advantageously cured at relatively low temperatures, e.g. between room temperature (20° to 25° C.) and the temperature at which significant vaporization of its most volatile component is initiated, ordinarily between 20° and 70° C. The radiation energy is applied at dose rates of about 0.1 to about 100 Mrad per second upon a preferably moving workpiece with the coating receiving a total dose in the range of about 0.5 to about 100, ordinarily between about 1 and about 25, and most commonly between 5 and 15 Mrad. The films can be converted by the electron beam into tenaciously bound, wear and weather resistant, coatings.

The abbreviation "Mrad" as employed herein means 1,000,000 rad. The term "rad" as employed herein means that dose of radiation which results in the absorption of 100 ergs of energy per gram of absorber, e.g. coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam, which may be about ⅛ inch in diameter at this point, is then scanned to make a fan-shaped beam and then passed through a metal window, e.g. a magnesium-thorium alloy, aluminum, an alloy of aluminum and a minor amount of copper, etc., of about 0.003 inch thickness.

The term "vinyl monomers" as used herein refers to a monomeric compound having a

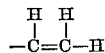

or

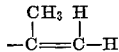

terminal group and excludes allylic compounds. The preferred vinyl monomers are esters of $C_1$ to $C_8$ monohydric alcohols and acrylic or methacrylic acid, e.g. ethyl acrylate, ethyl methacrylate, butyl acrylate, butyl methacrylate, octyl acrylate, 2-ethyl hexyl acrylate, etc. Alcohols of higher carbon number, e.g. $C_9$–$C_{15}$, can also be used to prepare such acrylates and methacrylates. Vinyl hydrocarbon monomers, e.g. styrene and alkylated styrenes such as vinyl toluene, alpha-methyl styrene, etc., may be used separately or in combination with acrylates and methacrylates. Also in combination with acrylates and methacrylates and/or vinyl hydrocarbon monomers, there may be used minor amounts of other vinyl monomers such as nitriles, e.g. acrylonitrile, acrylamide, N-methylol acrylonitrile, vinyl halides, e.g. vinyl chloride, and vinyl carboxylates, e.g. vinyl acetate.

Epoxide resins are used in commercially available coatings which are characterized by having good chemical resistance to alkalis, excellent adhesion properties, and both good hardness and flexibility. On the other hand, they have a marked tendency to chalk out of doors and their water resistance is not always the best. These coatings are conventionally crosslinked by means of polyamines, organic acids, or anhydrides. Cure times vary from a few minutes to several hours. In contrast, the alpha-beta olefinically unsaturated epoxy resins can be crosslinked with alpha-beta olefinically unsaturated materials in a few seconds at ambient temperature in the presence of ionizing radiation.

In a preferred embodiment, the alpha-beta olefinically unsaturated epoxy resins are prepared by reacting a diepoxide with an alpha-beta olefinically unsaturated carboxylic acid. In other embodiments, the unsaturation is provided by reacting the diepoxide with an anhydride of an alpha-beta olefinically unsaturated carboxylic acid or a monohydroxy ester of such an acid, the latter advisedly employed in excess. The preparation of diepoxides suitable for use in preparing the resins used herein is discussed in detail in Modern Surface Coatings, Paul Nylen and Edward Sunderland, 1965 Interscience Publishers, a division of John Wiley & Sons, Ltd., London, New York, Sydney, Library of Congress Catalog Card Number 65–28344, pp. 197–208. These starting polymers or prepolymers may be either of the epichlorohydrin-bisphenol type or the epichlorohydrin-polyalcohol type. A large number of such polymers are commercially available. The preparation of epoxy resins is also discussed in U.S. Patents 2,467,171; 2,538,072; 2,558,959, and 2,694,694 and elsewhere throughout past and current literature. The starting polymer advantageously has a molecular weight of at least about 320 and below about 10,000, preferably between about 380 and about 3800. The terminally unsaturated epoxy resins used in this invention advantageously have a molecular weight above about 370, preferably in the range of about 500 to about 4000, and contain about 0.5 to about 5, preferably about 1 to about 3.5, alpha-beta olefinic unsaturation units per 1,000 units molecular weight.

The film-forming material should have an application viscosity low enough to permit rapid application to the substrate in substantially even depth and high enough so that at least 1 mil (.001 inch) film will hold upon a vertical surface without sagging. Such films will ordinarily be applied to an average depth of about 0.1 to about 4 mils with appropriate adjustment in viscosity and application technique. It will be obvious to those skilled in the art that the choice of siloxane and of hydroxy esters in preparing the alpha-beta olefinically unsaturated siloxane component of the binder solution can be varied so as to vary the viscosity of the siloxane component. The molecular weight of the epoxy resin may also be varied to control the viscosity of the binder solution. Also, the type and quantity of vinyl monomers in the binder solution are easily adjusted to provide a proper consistency for application by conventional paint application techniques, e.g. spraying, roll coating, etc. It is also within the scope of this invention to employ a binder solution wherein the unsaturated epoxy resin and the siloxane-unsaturated ester product are the only polymerizable components and to apply such coating materials in solution with a volatile solvent which can be flashed off prior to curing.

Where the binder consists essentially of the alpha-beta olefinically unsaturated epoxy resin and the alpha-beta olefinically unsaturated polysiloxane, the binder contains about 20 to about 80, advantageously about 30 to about 70, parts by weight of the epoxy resin and about 20 to about 80, advantageously about 30 to about 70, parts by weight of the siloxane.

Where the binder contains significant amounts of vinyl monomers, the binder will advantageously contain about 10 to about 200, preferably about 20 to about 100, parts by weight vinyl monomers and a resinous component that comprises about 20 to about 80, preferably about 30 to about 70, parts by weight of the siloxane and about 20 to about 80, preferably about 30 to about 70, parts by weight of the epoxy resin. Minor amounts of other polymerizable monomers, e.g. allylic compounds, may be used to make up the balance, if any. This invention is particularly concerned with those coatings wherein the film-forming solution, exclusive of vinyl monomers, consists essentially of the epoxy binder resin and the siloxane-unsaturated ester product, herein defined to mean coating compositions wherein these components constitute at least 85 wt. percent of the film-forming binder.

This invention will be more fully understood from the following illustrative examples:

EXAMPLE 1

A siloxane-unsaturated ester and vinyl monomer-comprising paint is prepared from the following components in the manner hereinafter set forth:

(a) Preparation of the siloxane component

| Reactants: | Parts by weight |
|---|---|
| Methoxy functional acyclic siloxane [1] | 178 |
| Hydroxyethyl methacrylate | 118 |
| Tetraisopropyl titanate | 0.32 |
| Hydroquinone | 0.06 |

[1] A commercially available methoxylated partial hydrolysate of monophenyl and phenylmethyl silanes (largely condensed dimethytriphenyltrimethoxysiloxane) and has the following typical properties:

| | |
|---|---|
| Average molecular weight | 750–850 |
| Average number of silicon atoms per molecule | 5–6 |
| Average number of methoxy groups per molecule | 3–4 |

The siloxane, the methacrylate monomer and hydroquinone polymerization inhibitor are heated to 100° C. in a flask fitted with a Barrett type distillation receiver. The titanate catalyst is added and the temperature is raised to 150° C. over a three hour period during which time methanol is removed by distillation. The cooled reaction product has a viscosity of 0.6 stoke at 25° C.

(b) Preparation of the alpha-beta olefinically unsaturated epoxy resins

An epoxide polymer is prepared in the following manner: to a 2,000 ml., 3-neck flask equipped with stirrer, dropping funnel, thermometer and nitrogen inlet, is added

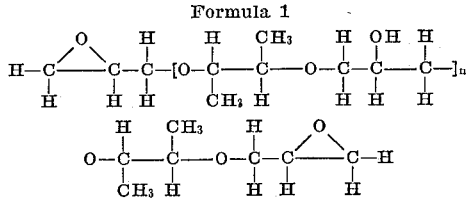

1 mole of 2,3-butanediol (91.12 gms.) and 4 moles of epichlorohydrin (370.0 gms.). The temperature is maintained at 110° C. while 2 moles sodium hydroxide (80.0 gms.) is added dropwise as a 30% aqueous solution. The rate of addition is regulated so that the reaction mixture remains neutral. After about 3 hours, the organic layer is separated, dried, distilled and a polymer is recovered. This polymeric product is represented by the following structural formula:

Formula 1

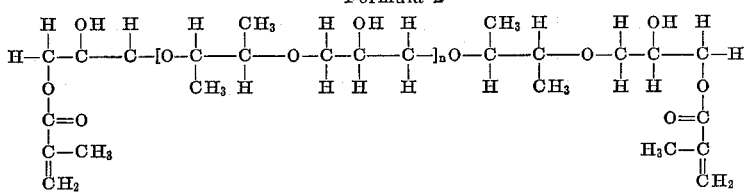

To 210 grams of this polymer are added 86 grams of methacrylic acid containing 0.1 gram hydroquinone. While stirring in a nitrogen atmosphere, the mixture is heated to 140° C. for 20 minutes and then cooled to room temperature, i.e. 26° C. The unsaturated polyepoxide polymer formed is represented by the following structural formula:

Formula 2

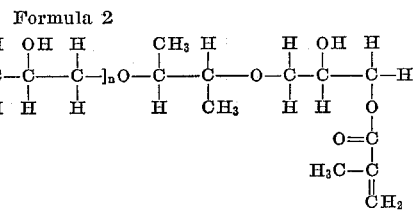

Two coatings are prepared and applied as films of about 2 mils thickness to metal panels, 3″ x 5″ phosphated steel panels, and cured thereon by ionizing radiation in a nitrogen atmosphere.

(c) Preparation of the paint

| Components: | Parts by weight |
|---|---|
| Siloxane-ester product of (a) above | 10 |
| Epoxy resin-Formula 2 | 15 |
| Methyl methacrylate | 5 |

This paint is applied to a metal substrate to an average depth of about 1 mil (.001 inch) and cured to a hard film using the following irradiation conditions:

| | |
|---|---|
| Electron beam potential _____kv__ | 270 |
| Electron beam current _____ma__ | 25 |
| Dose _____Mrad__ | 15 |
| Atmosphere | nitrogen |
| Distance, workpiece to emitter _____inches__ | 10 |

EXAMPLE 2

The procedure of Example 1 is repeated while substituting for the epoxy resin used therein a series of commercially available epoxide resins of the bisphenol-A-epichlorohydrin type, each of which is represented by the following formula:

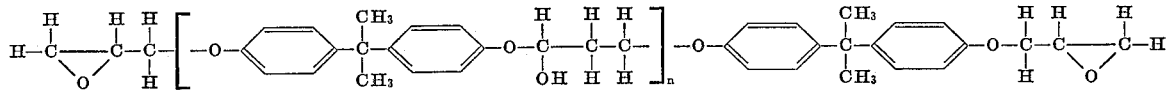
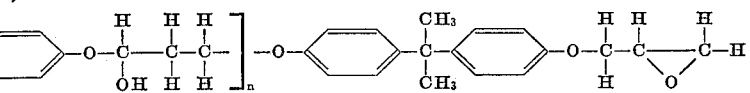

The resins employed have the following typical properties.

| Trademark [1] | Melting range, ° C. | Viscosity in poise at 25° C. | Epoxide equivalent [2] | Equivalent weight [3] | Molecular weight average | n in the formula, average value |
|---|---|---|---|---|---|---|
| Epon 828 | Liquid | 100–150 | 175–210 | 85 | 380 | |
| Epon 834 | Liquid | [4] 3.8–9.0 | 225–290 | 105 | 470 | 0.5 |
| Epon 1001 | 64–76 | [5] 0.8–1.7 | 450–525 | 130 | 900 | 2.0 |
| Epon 1004 | 95–105 | [5] 4.3–6.3 | 870–1,025 | 175 | 1,400 | 3.7 |
| Epon 1007 | 125–132 | [5] 17.5–27.0 | 1,650–2,050 | 190 | 2,900 | 8.8 |
| Epon 1009 | 140–155 | [5] 36.2–98.5 | 2,400–4,000 | 200 | 3,750 | 12.0 |

[1] Shell Chemical Co.—In Europe the trade name "Epikote" followed by the same figures.
[2] Gram of resin containing 1 g.-equivalent of epoxide.
[3] Gram of resin required to esterify completely 1 mole of a monobasic acid, e.g. 280 g. of a $C_{18}$ fatty acid.
[4] Available as a 70% solution in butyl carbitol.
[5] Available as a 40% solution in butyl carbitol.

EXAMPLE 3

The procedure of Example 2 is repeated except that methacrylic acid is substituted for the acrylic acid reacted with the listed epoxide resins.

EXAMPLE 4

The procedure of Examples 1–3 are repeated except that the siloxane component is prepared from the following components in the following manner:

| Reactants: | Parts by weight |
|---|---|
| Hydroxy functional cyclic siloxane [1] | 600 |
| Hydroxyethyl methacrylate | 71 |
| Hydroquinine | 0.1 |
| Xylene, solvent | 116 |

[1] A commercially available hydroxy functional, cyclic polysiloxane having the following typical properties:

| Hydroxy content, Dean Stark: | |
|---|---|
| Percent condensible | 5.5 |
| Percent free | 0.5 |
| Average molecular weight | 1600 |
| Combining weight | 400 |
| Refractive index | 1.531 to 1.539 |
| Softening point, Durran's Mercury Method, degrees F. | 200 |

At 60% solids in xylene

| Specific gravity at 77° F. | 1.075 |
|---|---|
| Viscosity at 77° F., centipoises | 33 |
| Gardner-Holdt | A-1 |

Procedure

A three neck flask fitted with a stirring meter, a thermometer, a nitrogen inlet and a Barrett trap is charged with the siloxane, the methacrylate, the xylene and the hydroquinone. This solution is heated to reflux, 138° C., over a 30 minute period. Nitrogen is bubbled into the reaction throughout the whole procedure. By-product water is slowly removed and the temperature gradually rises to 146° C. After 5 hours, 8.5 ml. of water is collected indicating nearly complete reaction. The xylene is removed by reduced pressure distillation.

EXAMPLE 5

The procedure of Example 1 is repeated except that the polysiloxane employed to produce the alpha-beta olefinically unsaturated siloxane is a methoxylated partial hydrolysate of monophenyl and phenylmethyl silanes consisting essentially of dimethyltriphenyltrimethoxytrisiloxanes and has the following typical properties:

| Average molecular weight | 470 |
|---|---|
| Combining weight | 155 |
| Specific gravity at 77° F. | 1.105 |
| Viscosity at 77° F., centistokes | 13 |

EXAMPLE 6

The procedures of Examples 1, 4 and 5 are repeated except that the vinyl monomer content is adjusted to comprise 10 weight percent of the binder solution.

EXAMPLE 7

The procedures of Examples 1, 4 and 5 are repeated except that the vinyl monomer content is adjusted to comprise 25 weight percent of the binder solution and is a mixture of styrene and methyl methacrylate.

EXAMPLE 8

The procedures of Examples 1, 4 and 5 are repeated except that the vinyl monomer content is adjusted to comprise 50 weight percent of the binder solution and is an equimolar mixture of methyl methacrylate, butyl acrylate and octyl acrylate.

EXAMPLE 9

The procedures of Examples 1, 4 and 5 are repeated except that the vinyl monomer content is adjusted to comprise 60 weight percent of the binder solution and is an equimolar mixture of vinyl toluene, butyl methacrylate, and 2-ethyl hexyl acrylate.

EXAMPLE 10

The procedures of Examples 1, 4 and 5 are repeated except that the solution is free of vinyl monomers and is diluted to spraying consistency, where necessary, with an equimolar mix of toluene and methyl ethyl ketone.

EXAMPLE 11

The procedures of Examples 1, 4 and 5 are repeated using 1 part by weight of the epoxide resin and 4 parts by weight of the siloxane-unsaturated resin product.

EXAMPLE 12

The procedures of Examples 1, 4 and 5 are repeated using 1 part by weight of the siloxane-unsaturated resin product and 4 parts by weight of the epoxide resin.

EXAMPLE 13

The procedures of Examples 1, 4 and 5 are repeated using 30 parts by weight of the siloxane-unsaturated resin product and 70 parts by weight of the epoxide resin.

EXAMPLE 14

The procedures of Examples 1, 4 and 5 are repeated using 70 parts by weight of the siloxane-unsaturated resin product and 30 parts by weight of the epoxide resin.

EXAMPLE 15

The procedure of Example 1 is repeated except that the polysiloxane employed in the preparation of the alpha-beta olefinically unsaturated siloxane is dipropoxy-tetramethylcyclotrisiloxane.

EXAMPLE 16

The procedure of Example 1 is repeated except that the polyisiloxane employed in the preparation of the alpha-beta olefinically unsaturated siloxane is dibutoxy-tetramethyldisiloxane.

EXAMPLE 17

The procedures of Examples 1–5 are repeated except that an equivalent amount of 2-hydroxyethyl acrylate is substituted for the hydroxyethyl methacrylate in the preparation of the alpha-beta olefinically unsaturated siloxane.

EXAMPLE 18

The procedures of Examples 1–5 are repeated except that an equivalent amount of 2-hydroxypropyl methacrylate is substituted for the hydroxyethyl methacrylate in preparation of the alpha-beta olefinically unsaturated siloxane.

EXAMPLE 19

The procedures of Examples 1–5 are repeated except that an equivalent amount of 2-hydroxybutyl acrylate is substituted for the hydroxyethyl methacrylate in preparation for the alpha-beta olefinically unsaturated siloxane.

EXAMPLE 20

The procedures of Examples 1–5 are repeated except that an equivalent amount of 2-hydroxydodecanyl methacrylate is substituted for the hydroxyethyl methacrylate in preparation of the alpha-beta olefinically unsaturated siloxane.

EXAMPLE 21

The procedures of Examples 1–5 are repeated except that an equivalent amount of 3-chloro-2-hydroxypropyl acrylate is substituted for the hydroxyethyl methacrylate in preparation of the alpha-beta olefinically unsaturated siloxane.

EXAMPLE 22

The procedures of Examples 1–5 are repeated except that an equivalent amount of 3-acryloxy-2-hydroxypropyl methacrylate is substituted for the hydroxyethyl methacrylate in preparation of the alpha-beta olefinically unsaturated siloxane.

EXAMPLE 23

The procedures of Examples 1–5 are repeated except that an equivalent amount of 3-crotonoxy-2-hydroxypropyl acrylate is substituted for the hydroxyethyl methacrylate in preparation of the alpha-beta olefinically unsaturated siloxane.

EXAMPLE 24

The procedures of Examples 1–5 are repeated except that an equivalent amount of 3-acryloxy-2-hydroxypropyl cinnamate is substituted for the hydroxyethyl methacrylate in preparation of the alpha-beta olefinically unsaturated siloxane.

EXAMPLE 25

The procedures of Examples 1–5 are repeated except that an equivalent amount of 3-acryloxy-2-hydroxypropyl crotonate is substituted for the hydroxyethyl methacrylate in preparation of the alpha-beta olefinically unsaturated siloxane.

EXAMPLE 26

The procedures of Examples 1–5 are repeated except that in the preparation of the alpha-beta olefinically unsaturated siloxane there is used an amount of the monohydroxy ester that is sufficient to react with at least one hydroxy or hydrocarbonoxy functional group of the siloxane but insufficient to react with all of such functional groups of the siloxane molecules in the reaction mixture.

EXAMPLE 27

The procedures of Examples 1–5 are repeated except that in the preparation of the alpha-beta olefinically unsaturated siloxane there is used an amount of the monohydroxy ester that is in excess of the amount required to satisfy all of the hydroxy and hydrocarbonoxy functional groups of the siloxane molecules in the reaction mixture.

EXAMPLE 28

A pigmented paint is prepared by premixing 75 parts by weight of the siloxane-unsaturated ester product of Example 4 with 150 parts by weight of commercial grade titanium dioxide pigment and 20 parts by weight of methyl methacrylate. The mixture is ground by shaking with an equal amount of glass beads in a conventional paint shaker for 30 minutes. The premix is diluted with an additional 75 parts by weight of the siloxane-unsaturated ester product and 65 parts by weight of the resultant mix are diluted with 35 parts by weight of a equimolar mixture of styrene and methyl methacrylate. This mix is added to 35 parts by weight methyl methacrylate and 65 parts by weight of the alpha-beta olefinically unsaturated epoxy ester of Example 1. The paint is applied to metal, wood and polymeric (ABS-acrylonitrile-butadiene-styrene copolymer) substrates to an average depth of about 1.5 mils and cured thereon with an electron beam in the manner of the previous examples.

EXAMPLE 29

The procedure of Example 1 is repeated except that curing is effected with a beam potential of 175,000 volts with the workpiece 3 inches from the emitter and at 400,000 volts at 10 inches, each being in a nitrogen atmosphere containing minor amounts of carbon dioxide.

EXAMPLE 30

Paints are prepared by admixing 160 parts by weight of the siloxane-unsaturated ester product of Example 1 and 160 parts by weight of the epoxy resin of Example 1, dividing this mix into two equal parts, and diluting one such part with 100 parts by weight methyl methacrylate and the other part with 200 parts by weight methyl methacrylate. The resultant film-forming solutions are applied to metal substrates and crosslinked thereon with an electron beam in the manner of the preceding examples.

EXAMPLE 31

Paints are prepared by admixing 40 parts by weight of the siloxane-unsaturated ester product of Example 1 and 40 parts by weight of the epoxy resin of Example 1, dividing this mix into two equal parts, and diluting one such part with 10 parts by weight methyl methacrylate and the other part with 20 parts by weight methyl methacrylate. The resultant film-forming solutions are applied to metal substrates and crosslinked thereon with an electron beam in the manner of the preceding examples.

It will be understood by those skilled in the art that modifications can be made within the foregoing examples within the scope of the invention as hereinafter claimed.

I claim:

1. An article of manufacture comprising in combination a substrate and a coating adhered thereto and comprising the polymerization product of a film-forming dispersion crosslinked in situ by ionizing radiation, said film-forming dispersion on a pigment ad particulate filler-free basis consisting essentially of (1) an alpha-beta olefinically unsaturated siloxane formed by reacting a siloxane containing about 3 to about 18 silicon atoms per molecule and having at least two functional groups selected from hydroxl groups and hydrocarbonoxy groups with a monohydroxy alkyl ester of an alpha-beta olefinically unsaturated monocarboxylic acid, and (2) an alpha-beta olefinically unsaturated resin formed by reacting a compound consisting essentially of carbon, hydrogen and oxygen and containing at least two epoxide groups with acrylic or methacrylic acid, having molecular weight in the range of about 380 to about 10,000, and containing between about 0.5 and about 5 units of alpha-beta olefinic unsaturation per 1,000 units molecular weight.

2. An article of manufacture comprising in combination a substrate and a coating adhered thereto and comprising the polymerization product of a film-forming dispersion crosslinked in situ by ionizing radiation, said film-forming dispersion on a pigment and particulate filler-free basis consisting essentially of (1) about 20 to about 80 parts by weight of an alpha-beta olefinically unsaturated siloxane formed by reacting a siloxane having at least two functional groups selected from hydroxyl groups and $C_1$–$C_4$ alkoxy groups with a monohydroxy alkyl ester of an alpha-beta olefinically unsaturated monocarboxylic acid, and (2) about 80 to about 20 parts by weight of an alpha-beta olefinically unsaturated resin formed by reacting a compound consisting essentially of carbon, hydrogen and oxygen and containing at least two epoxide groups with acrylic or methacrylic acid, having molecular weight in the range of about 500 to about 4,000, and containing between about 0.5 and about 3.5 units of alpha-beta olefinic unsaturation per 1,000 units molecular weight.

3. An article of manufacture in accordance with claim 2 wherein said monohydroxy ester is an acrylate or methacrylate.

4. An article of manufacture in accordance with claim 2 wherein said monohydroxy ester is a cinnamate.

5. An article of manufacture in accordance with claim 2 wherein said monohydroxy ester is a crotonate.

6. An article of manufacture in accordance with claim 2 wherein said siloxane contains about 3 to about 12 silicon atoms.

7. An article of manufacture comprising in combination a substrate and a coating having average depth in the range of about 0.1 to about 4 mils adhered thereto and comprising the polymerization product of a film-forming dispersion crosslinked in situ by ionizing radiation, said film-forming dispersion on a pigment and particulate filler-free basis consisting essentially of (1) about 10 to about 200 parts by weight vinyl monomers, (2) about 20 to about 80 parts by weight of an alpha-beta olefinically unsaturated siloxane formed by reacting a siloxane containing about 3 to about 18 silicon atoms per molecule and having at least two functional groups selected from hydroxy and $C_1$–$C_4$ alkoxy groups with a monohydroxy alkyl ester of an alpha-beta olefinically unsaturated monocarboxylic acid, and (3) about 20 to about 80 parts by weight of an alpha-beta olefinically unsaturated resin formed by reacting a diepoxide consisting essentially of carbon, hydrogen and oxygen with acrylic or methacrylic acid, having molecular weight in the range of about 500 to about 4,000, and containing between about 0.5 and about 5.0 units of alpha-beta olefinic unsaturation per 1,000 units molecular weight.

8. An article of manufacture comprising in combination a substrate and a coating having average depth in the range of about 0.1 to about 4 mils adhered thereto and comprising the polymerization product of a film-forming dispersion crosslinked in situ by ionizing radiation, said film-forming dispersion on a pigment and particulate filler-free basis consisting essentially of (1) about 10 to about 200 parts by weight vinyl monomers at least a major proportion of which are selected from esters of acrylic or methacrylic acid and a $C_1$–$C_8$ monohydric alcohol and $C_8$–$C_9$ monovinyl hydrocarbons, (2) about 30 to about 70 weight percent of an alpha-beta olefinically unsaturated siloxane formed by reacting a siloxane containing about 3 to about 18 silicon atoms per molecule and having at least two functional groups selected from hydroxy groups and methoxy groups with a monohydroxy ester of acrylic or methacrylic acid selected from hydroxyethyl acrylate, hydroxyethyl methacrylate, hydroxypropyl acrylate, and hydroxypropyl methacrylate, the remaining valences of said silicon atoms being satisfied with hydrocarbon radical, oxygen, hydrocarbonoxy radical, hydrogen or hydroxyl, and (3) about 30 to about 70 parts by weight of an alpha-beta olefinically unsaturated resin formed by reacting a diepoxide with acrylic or methacrylic acid, having molecular weight in the range of about 500 to about 4,000, and containing between about 1 and about 3.5 units of alpha-beta olefinic unsaturation per 1,000 units molecular weight.

References Cited
UNITED STATES PATENTS

| | | | |
|---|---|---|---|
| 3,427,189 | 2/1969 | Brechna | 117—161X |
| 3,429,947 | 2/1969 | Eygen et al. | 260—836 |
| 3,437,513 | 4/1969 | Burlant et al. | 260—827X |
| 3,488,304 | 1/1970 | Baugh et al. | 260—22 |

ALFRED L. LEAVITT, Primary Examiner

E. G. WHITBY, Assistant Examiner

U.S. Cl. X.R.

117—104, 127, 138.8, 147, 161; 204—159.14; 260—41, 827